(12) United States Patent
Hung

(10) Patent No.: US 10,578,242 B2
(45) Date of Patent: Mar. 3, 2020

(54) SECURING BASE FOR HOLDING UP A DISPLAY SUSPENDING APPARATUS THEREON

(71) Applicant: MODERNSOLID INDUSTRIAL CO., LTD., Taichung (TW)

(72) Inventor: Chin-Jui Hung, Taichung (TW)

(73) Assignee: MODERNSOLID INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 16/269,361

(22) Filed: Feb. 6, 2019

(65) Prior Publication Data
US 2019/0295446 A1 Sep. 26, 2019

(30) Foreign Application Priority Data
Mar. 21, 2018 (TW) ............. 107203661 U

(51) Int. Cl.
| | | |
|---|---|---|
| F16M 11/10 | (2006.01) | |
| F16M 13/02 | (2006.01) | |
| F16M 11/20 | (2006.01) | |
| F16M 13/04 | (2006.01) | |
| F16M 11/06 | (2006.01) | |
| F16B 2/06 | (2006.01) | |
| F16M 11/04 | (2006.01) | |
| A47B 21/03 | (2006.01) | |
| F16B 2/12 | (2006.01) | |

(52) U.S. Cl.
CPC ............ *F16M 11/10* (2013.01); *F16M 11/06* (2013.01); *F16M 11/20* (2013.01); *F16M 13/02* (2013.01); *F16M 13/022* (2013.01); *A47B 21/0314* (2013.01); *A47B 2200/0085* (2013.01); *F16B 2/065* (2013.01); *F16B 2/12* (2013.01); *F16M 11/041* (2013.01)

(58) Field of Classification Search
CPC ........ A47B 2200/0085; A47B 21/0314; F16M 13/022; F16M 11/06; F16M 11/10; F16M 11/20; F16B 2/065; F16B 2/20; F16B 2/12; B25B 5/10
USPC .... 248/689, 229.16, 229.15, 229.25, 231.41, 248/231.61, 231.71, 917
See application file for complete search history.

(56) References Cited

U.S. PATENT DOCUMENTS

| | | | | |
|---|---|---|---|---|
| 1,372,205 A | * | 3/1921 | Smith | .............. G09F 1/10 40/658 |
| 1,789,815 A | * | 1/1931 | Hanley | .............. A47B 13/16 248/231.71 |
| 2,191,085 A | * | 2/1940 | Rosen | .............. B60R 1/06 248/475.1 |

(Continued)

*Primary Examiner* — Hiwot E Tefera
*Assistant Examiner* — Taylor L Morris
(74) *Attorney, Agent, or Firm* — Fox Rothschild LLP; Robert J. Sacco; Carol E. Thorstad-Forsyth

(57) ABSTRACT

A securing base includes a base seat unit and a clamp unit. The base seat unit includes a base seat formed with a receiving groove, and a securing plate secured to the base seat. The clamp unit includes a clamp member and a bolt member. The clamp member has an engaging segment disposed within the receiving groove, and a clamp segment disposed outside of the base seat unit. The bolt member extends drivingly through the engaging segment and extends rotatably into the securing plate. Rotation of the bolt member drives the clamp member to move along the bolt member, thereby moving the clamp segment to be distal from or proximate to the securing plate.

9 Claims, 12 Drawing Sheets

(56) References Cited

U.S. PATENT DOCUMENTS

| | | | | |
|---|---|---|---|---|
| 2,220,214 A * | 11/1940 | Cloutier | F16B 2/065 24/461 |
| 2,299,280 A * | 10/1942 | Reed | B60R 1/06 248/477 |
| 3,089,211 A * | 5/1963 | Perusse | A47G 21/167 24/556 |
| 3,596,862 A * | 8/1971 | Block | A45D 44/14 248/121 |
| 4,468,803 A * | 8/1984 | Ronci | F16M 11/08 378/167 |
| 4,787,613 A * | 11/1988 | Hayes | B25B 1/22 269/72 |
| 4,844,388 A * | 7/1989 | Kuba | A47B 21/0314 108/5 |
| 4,895,330 A * | 1/1990 | Anstead | A45B 1/04 248/229.12 |
| 5,205,222 A * | 4/1993 | Bernard | D06F 79/02 108/42 |
| 5,231,739 A * | 8/1993 | Mattesky | A47G 21/167 24/326 |
| 5,282,427 A * | 2/1994 | Steinhilber | A47B 21/03 108/152 |
| 5,312,079 A * | 5/1994 | Little, Jr. | F16B 2/065 248/214 |
| 5,330,147 A * | 7/1994 | Volcheff | A47B 21/0314 248/231.41 |
| 5,667,176 A * | 9/1997 | Zamarripa | B60R 1/12 248/231.51 |
| 5,743,499 A * | 4/1998 | Wang | A47B 21/0371 248/118 |
| 5,775,654 A * | 7/1998 | Price | A47G 23/0225 248/103 |
| 5,833,180 A | 11/1998 | Baranowski | |
| 5,842,671 A * | 12/1998 | Gibbs | A47G 23/0225 248/231.41 |
| 5,938,158 A * | 8/1999 | Tisbo | A47B 17/033 248/228.3 |
| 5,938,159 A * | 8/1999 | Hung | A47B 21/0314 248/278.1 |
| 5,971,171 A * | 10/1999 | Thorp | A47B 17/033 108/92 |
| 5,975,469 A * | 11/1999 | Chen | A47B 21/0371 248/118.1 |
| 5,975,472 A * | 11/1999 | Hung | F16M 11/105 248/278.1 |
| 6,042,064 A * | 3/2000 | Hong | A47B 21/0371 248/118 |
| 6,299,117 B1 * | 10/2001 | Lin | F16M 13/022 24/135 R |
| 6,394,403 B1 | 5/2002 | Hung | |
| 6,481,680 B2 * | 11/2002 | Neuman | A47G 29/083 248/215 |
| 6,619,644 B1 * | 9/2003 | Liou | B25B 1/125 269/185 |
| 6,672,553 B1 * | 1/2004 | Lin | F16M 11/08 248/276.1 |
| 6,769,657 B1 * | 8/2004 | Huang | F16M 11/10 248/278.1 |
| 6,880,791 B1 * | 4/2005 | Lin | F16M 13/02 248/231.61 |
| 6,986,489 B2 * | 1/2006 | Oddsen, Jr. | F16M 11/24 211/64 |
| 7,066,435 B2 * | 6/2006 | Oddsen, Jr. | F16M 11/10 248/220.31 |
| 7,121,516 B1 * | 10/2006 | Koh | A47B 17/033 248/226.11 |
| 7,195,215 B2 * | 3/2007 | Lin | F16M 11/2014 248/125.9 |
| 7,588,223 B2 * | 9/2009 | Wolvin | F16B 2/06 248/229.15 |
| 7,593,219 B2 * | 9/2009 | Quijano | F16M 11/10 248/923 |
| 7,823,520 B2 * | 11/2010 | Mayben | A47B 57/00 108/129 |
| 8,448,906 B2 * | 5/2013 | Sapper | F16M 11/10 248/125.2 |
| 8,756,870 B2 * | 6/2014 | Teller | E04D 13/10 52/24 |
| 8,826,831 B2 * | 9/2014 | Hazzard | A47B 21/02 108/50.01 |
| 9,764,628 B2 * | 9/2017 | Facchinello | B60J 7/198 |
| 9,873,244 B1 * | 1/2018 | Jurman | B41F 15/36 |
| 2003/0075653 A1 * | 4/2003 | Li | F16M 11/10 248/274.1 |
| 2007/0075198 A1 * | 4/2007 | Foser | E04C 2/428 248/226.11 |
| 2008/0265110 A1 * | 10/2008 | Helmonds | A45F 3/44 248/156 |
| 2008/0296334 A1 * | 12/2008 | Carnevali | B60R 11/0241 224/558 |
| 2010/0327129 A1 * | 12/2010 | Chen | F16M 11/14 248/121 |
| 2011/0315840 A1 * | 12/2011 | Connolly | F16M 11/041 248/220.31 |
| 2012/0084949 A1 | 4/2012 | Al-Basri | |
| 2012/0119040 A1 * | 5/2012 | Ergun | A47B 21/02 248/126 |
| 2013/0062489 A1 | 3/2013 | DiNello et al. | |
| 2013/0075564 A1 * | 3/2013 | Ho | F16B 2/12 248/316.4 |
| 2013/0075565 A1 | 3/2013 | Ho | |
| 2013/0306842 A1 | 11/2013 | Sakamoto | |
| 2013/0314890 A1 * | 11/2013 | Smith | F16M 11/10 361/825 |
| 2014/0226298 A1 * | 8/2014 | Palmer | H05K 5/0208 361/807 |
| 2016/0348835 A1 * | 12/2016 | Blalock | F16M 13/022 |
| 2018/0316307 A1 * | 11/2018 | Martin | H02S 40/34 |

* cited by examiner

SECURING BASE FOR HOLDING UP A DISPLAY SUSPENDING APPARATUS THEREON

CROSS-REFERENCE TO RELATED APPLICATION

This application claims priority of Taiwanese Patent Application No. 107203661, filed on Mar. 21, 2018.

FIELD

The disclosure relates to a securing base, and more particularly to a securing base for holding up a display suspending apparatus thereon.

BACKGROUND

Referring to FIGS. 1 and 2, a conventional display support 1 includes a display suspending apparatus 11 and a securing base 12. The display suspending apparatus 11 is for suspending a display (not shown), and has a bottom portion that is mounted to the securing base 12. The securing base 12 includes a base seat 13, a bolt member 14, and a clamp member 15. The base seat 13 has a securing groove 131 that is adapted for insertion of the display suspending apparatus 11, a receiving groove 132 that receives the clamp member 15, and an internal securing wall 133. The securing groove 131 and the receiving groove 132 are respectively located on opposite sides of the base seat 13. The bolt member 14 has a head portion 141 that is disposed at the securing groove 131 and that abuts against the internal securing wall 133, and an end portion 142 that extends from the head portion 141 through the internal securing wall 133, and that is rotatably secured to the clamp member 15. The clamp member 15 has an engaging segment 151 that is threadedly engaged with the bolt member 14, and a clamp segment 152 that is disposed outside of the base seat 13. The clamp segment 152 and the base seat 13 cooperatively define a clamp opening 16.

A user may drive the clamp member 15 to move along the bolt member 14 in an up-down direction, by rotating the bolt member 14 with a hex key (not shown). When the clamp member 15 is driven to move upward or downward by the bolt member 14, the clamp opening 16 is capable to be adjusted in opening size, such that the securing base 12 may be fittingly secured onto an edge of a platform (not shown). However, if the bolt member 14 is over-rotated in one direction, the clamp member 15 may easily fall off from the end portion 142 of the bolt member 14, rendering the securing base 12 non-functional.

SUMMARY

Therefore, an object of the disclosure is to provide a securing base that can alleviate the drawback of the prior art.

According to the disclosure, the securing base includes a base seat unit and a clamp unit.

The base seat unit includes a base seat and a securing plate. The base seat is adapted for supporting a display suspending apparatus thereon, has an internal securing wall, and is formed with a receiving groove, which has an opening, extends along an axis, and terminates at the internal securing wall. The securing plate is secured to the base seat and is disposed at the opening of the receiving groove.

The clamp unit includes a clamp member and a bolt member. The clamp member has an engaging segment that is disposed within the receiving groove and that is formed with a threaded hole, a clamp segment that is disposed outside of the base seat unit, and a connecting segment that interconnects the engaging segment and the clamp segment. The bolt member extends along the axis, engages drivingly the threaded hole of the engaging segment of the clamp member, and has a head portion that is rotatably secured to the internal securing wall of the base seat, and an end portion that extends rotatably into the securing plate.

Rotation of the bolt member drives the clamp member to move along the bolt member between a first position, where the engaging segment of the clamp member abuts against the securing plate of the base seat unit, and where the clamp segment of the clamp member is distal from the securing plate, and a second position, where the engaging segment of the clamp member is away from the securing plate of the base seat unit, and where the clamp segment of the clamp member is proximate to the securing plate.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
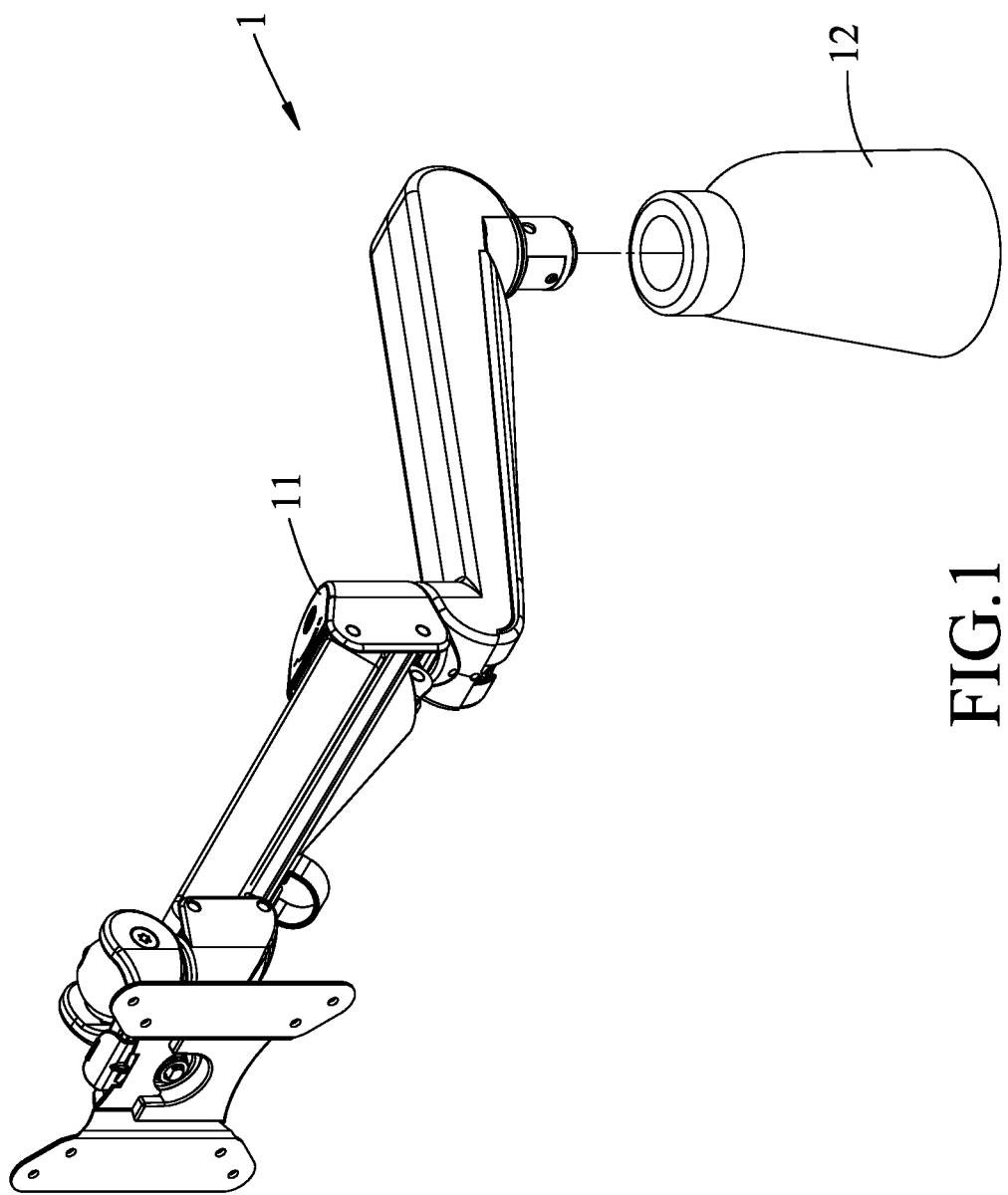
FIG. 1 is a partly exploded perspective view of a conventional display support.
Figure 2:
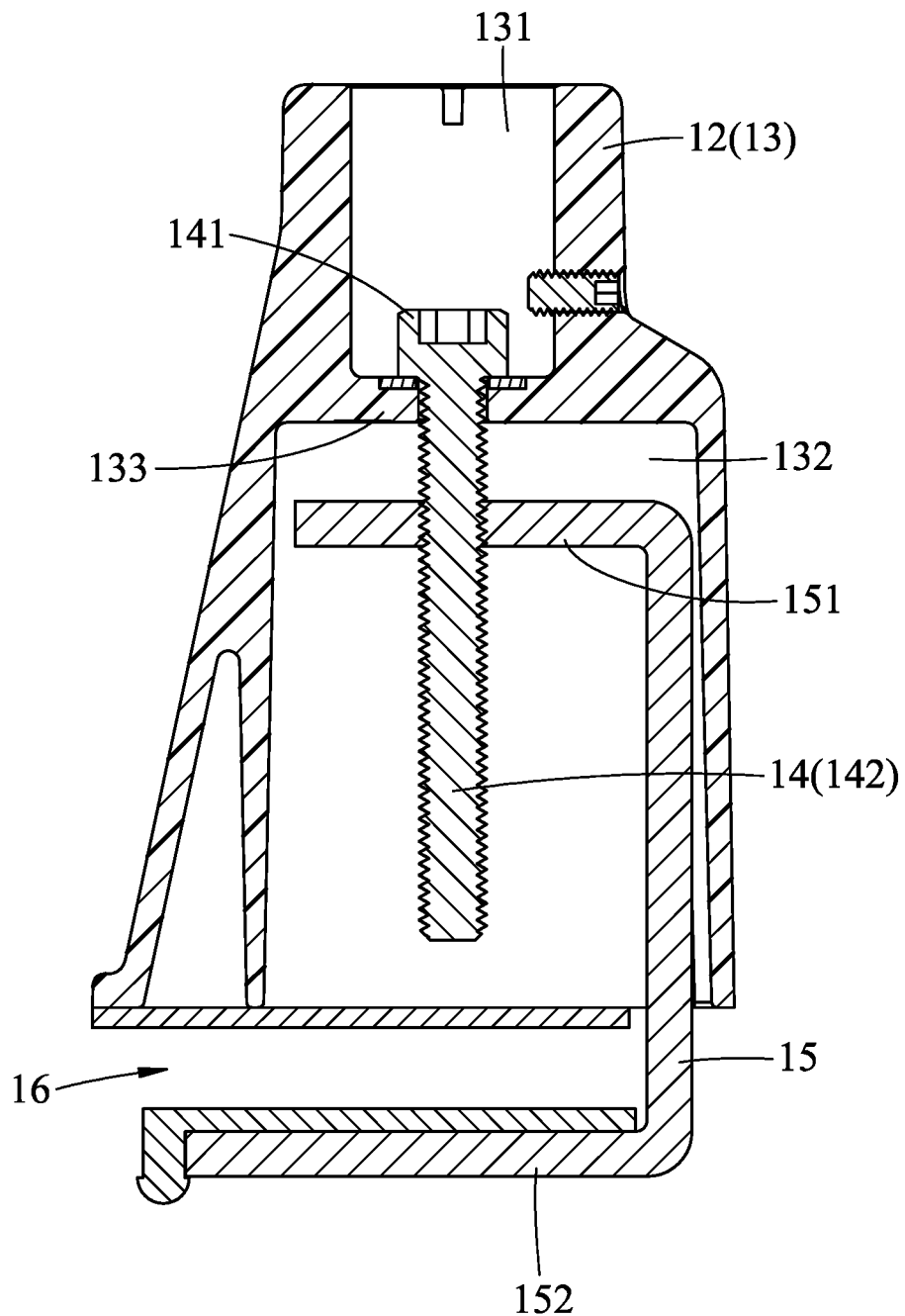
FIG. 2 is a sectional view of a securing base of the conventional display support.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
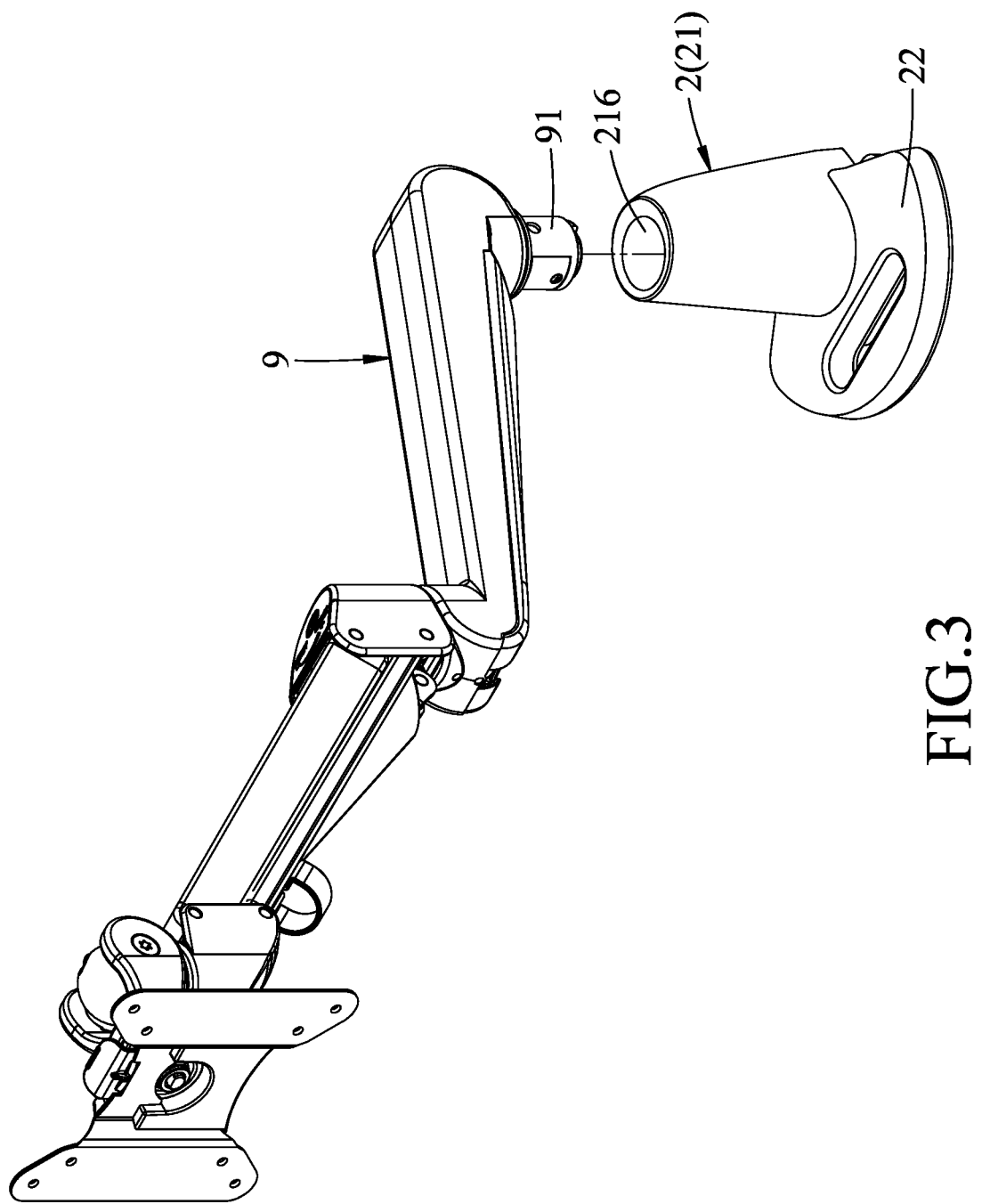
FIG. 3 is a perspective view of a first embodiment of a securing base according to the disclosure and a display suspending apparatus.
Figure 4:
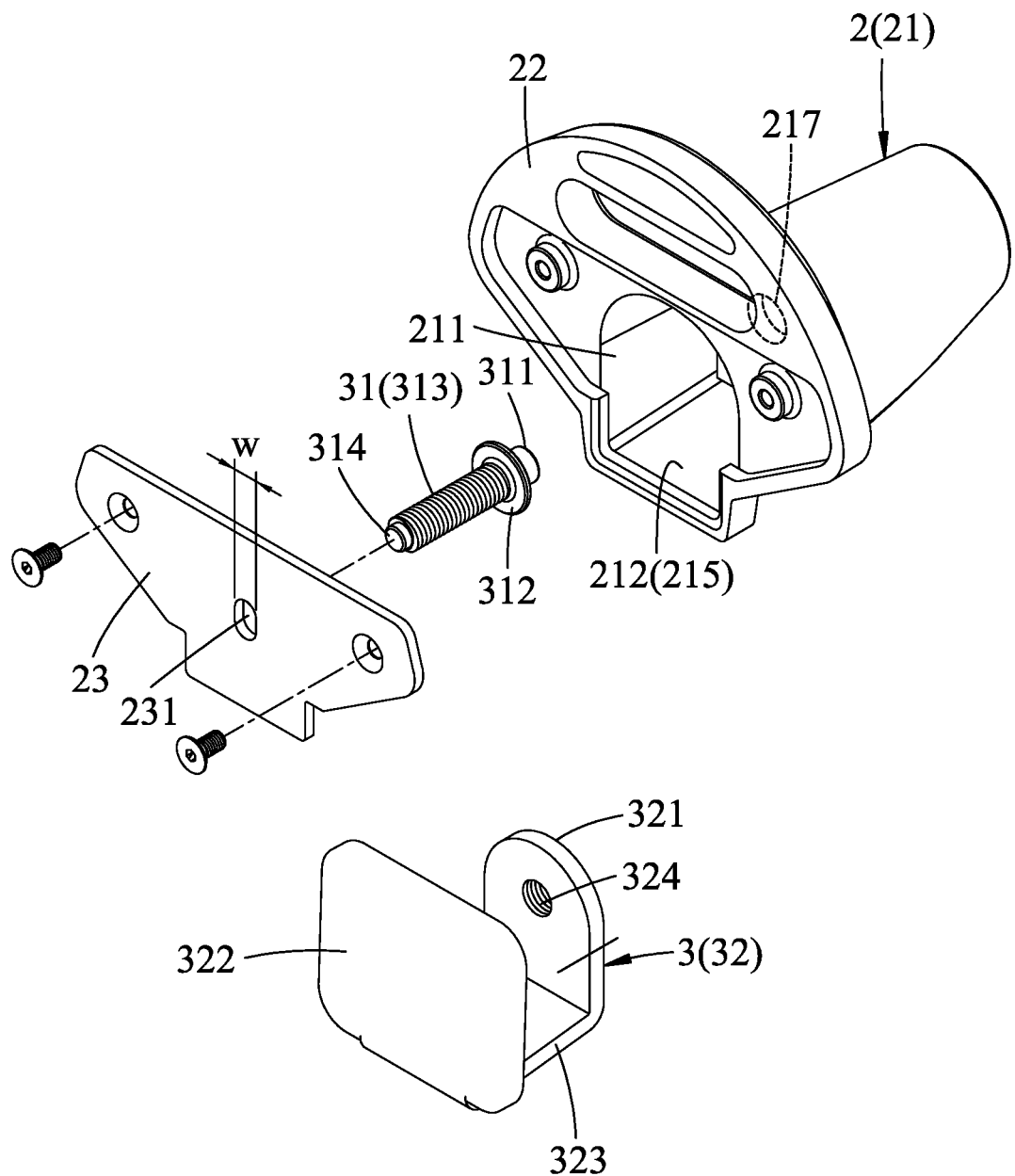
FIG. 4 is an exploded perspective view of the first embodiment.
Figure 5:
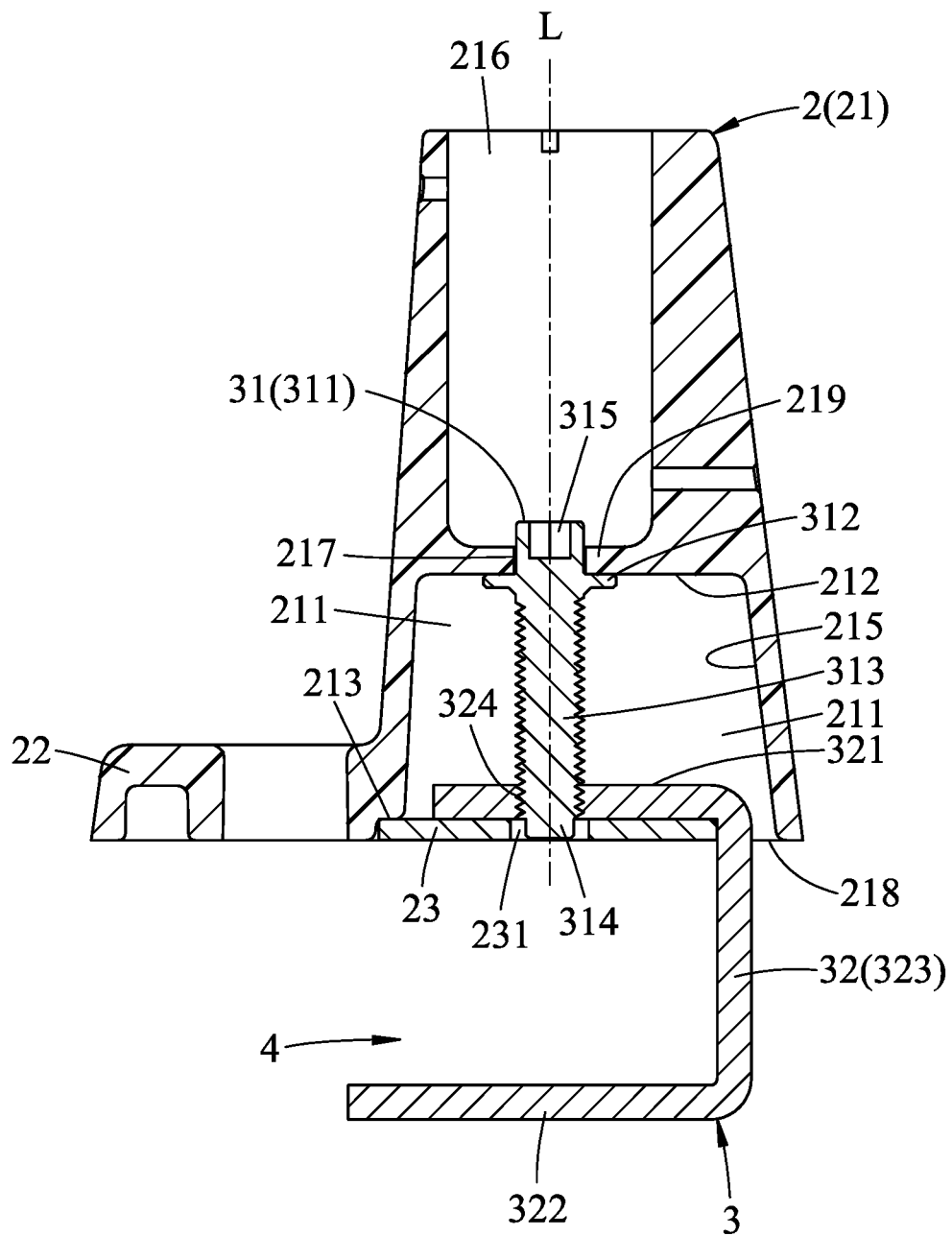
FIG. 5 is a sectional view of the first embodiment, illustrating a clamp member at a first position.

Referring to FIGS. 3 to 5, a first embodiment of a securing base according to the disclosure is adapted for supporting a display suspending apparatus 9 thereon. The display suspending apparatus 9 has a tip portion that is adapted for holding a display (not shown) and a root portion 91 that is adapted to be coupled with the securing base. The mechanism of the display suspending apparatus 9 is a known art, and will not be explored further in this disclosure.

The securing base includes a base seat unit 2 and a clamp unit 3. The base seat unit 2 is for coupling with the root portion 91 of the display suspending apparatus 9, and the clamp unit 3 may cooperatively clamp onto a platform 8 (see FIG. 8) with the base seat unit 2.

The base seat unit 2 includes a base seat 21, an abutment seat 22, and a securing plate 23. The base seat is substantially cylindrical, and has a groove-defining surface 212 that defines a receiving groove 211, and an internal securing wall 219. The receiving groove 211 has an opening 213, extends along an axis (L) and terminates at the internal securing wall 219. The internal securing wall 219 has an end surface that faces the securing plate 23, that serves as a portion of the groove-defining surface 212, and that is formed with a retaining hole 217. The groove-defining surface 212 has an inclined surface portion 215 that is inclined relative to the axis (L). The base seat 21 further has a securing groove 216 that is adapted for insertion of the display suspending apparatus 9. The receiving groove 211 and the securing groove 216 are disposed respectively at opposite sides of the internal securing wall 219. The retaining hole 217 extends through the internal securing wall 219, and is in spatial communication with the receiving groove 211 and the securing groove 216.

The abutment seat 22 is connected to the base seat 21, and is adjacent to the opening 213 of the receiving groove 211. The abutment seat 22 extends radially outward from a bottom end of the base seat 21, and has a shape that is substantially oval. In this embodiment, the abutment seat 22 and the base seat 21 are molded as one piece, but may be formed as separate pieces to be assembled during use in other embodiments.

The securing plate 23 is secured to the abutment seat 22 and is disposed at the opening 213 of the receiving groove 211 of the base seat 21. The securing plate 23 partially covers the opening 213, cooperatively defining a gap 218 with the inclined surface portion 215 of the groove-defining surface 212. The securing plate 23 is formed with an insert hole 231 that is aligned with the retaining hole 217 along the axis (L).

The clamp unit 3 includes a clamp member 32 and a bolt member 31. The clamp member 32 is U-shaped, and has an engaging segment 321, a clamp segment 322, and a connecting segment 323. The engaging segment 321 is disposed within the receiving groove 211, and is formed with a threaded hole 324. The clamp segment 322 is disposed outside of the base seat unit 2, and cooperates with the securing plate 23 to define a clamp opening 4. The connecting segment 323 passes through the gap 218 of the base seat 21, and interconnects the engaging segment 321 and the clamp segment 322. The engaging segment 321 is substantially perpendicular to the connecting segment 323, and the clamp segment 322 is substantially perpendicular to the connecting segment 323. In this embodiment, an angle between the engaging segment 321 and the clamp segment 322 and an angle between the clamp segment 322 and the connecting segment 323 range from 88 degrees to 92 degrees. In this embodiment, the clamp member 32 is made of ferroalloy, but it may be made of plastic or other metal materials in other embodiments.

The bolt member 31 has a head portion 311 that rotatably engages the retaining hole 217 of the base seat 21, an end portion 314 that is rotatably retained in the insert hole 231 of the securing plate 23, a flange portion 312 that is connected to the head portion 311, and a threaded portion 313 that interconnects the flange portion 312 and the end portion 314. The head portion 311 protrudes outwardly of the retaining hole 217 and faces the securing groove 216. In this embodiment, the head portion 311 has a polygonal hole 315 that may be engaged with a wrench for rotating the bolt member 31. The flange portion 312 is disposed in the receiving groove 211 and abuts against the internal securing wall 219 of the base seat 21. The threaded portion 313 extends along the axis (L), and engages drivingly the threaded hole 324 of the engaging segment 321 of the clamp member 32. In this embodiment, the insert hole is elliptic (as shown in FIG. 4), a maximum diameter of the threaded portion 313 is larger than a width (w) of the insert hole 231, and a diameter of the end portion 314 is smaller than the width of the insert hole 231, such that the insert hole 231 is configured in a manner that the end portion 314 is loosely received in the insert hole 231, and the threaded portion 313 of the bolt member 31 is not allowed to be inserted into the insert hole 231. It should be noted that, the retaining hole 217 and the insert hole 231 may be circular, elliptic, rectangular or any other shapes, as long as they are capable of keeping the bolt member 31 rotatably secured within the base seat 21.

Figure 6:
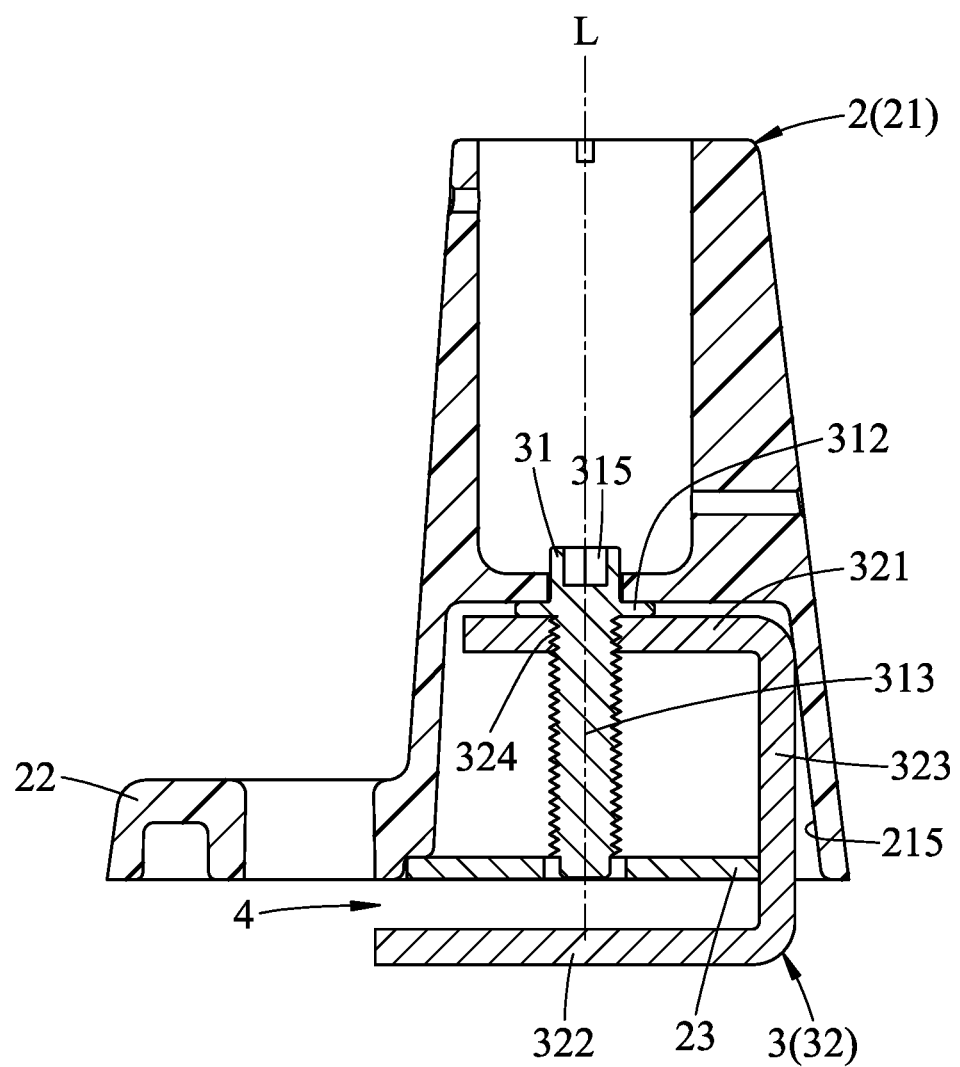
FIG. 6 is another sectional view of the first embodiment, illustrating the clamp member at a second position.
Figure 7:
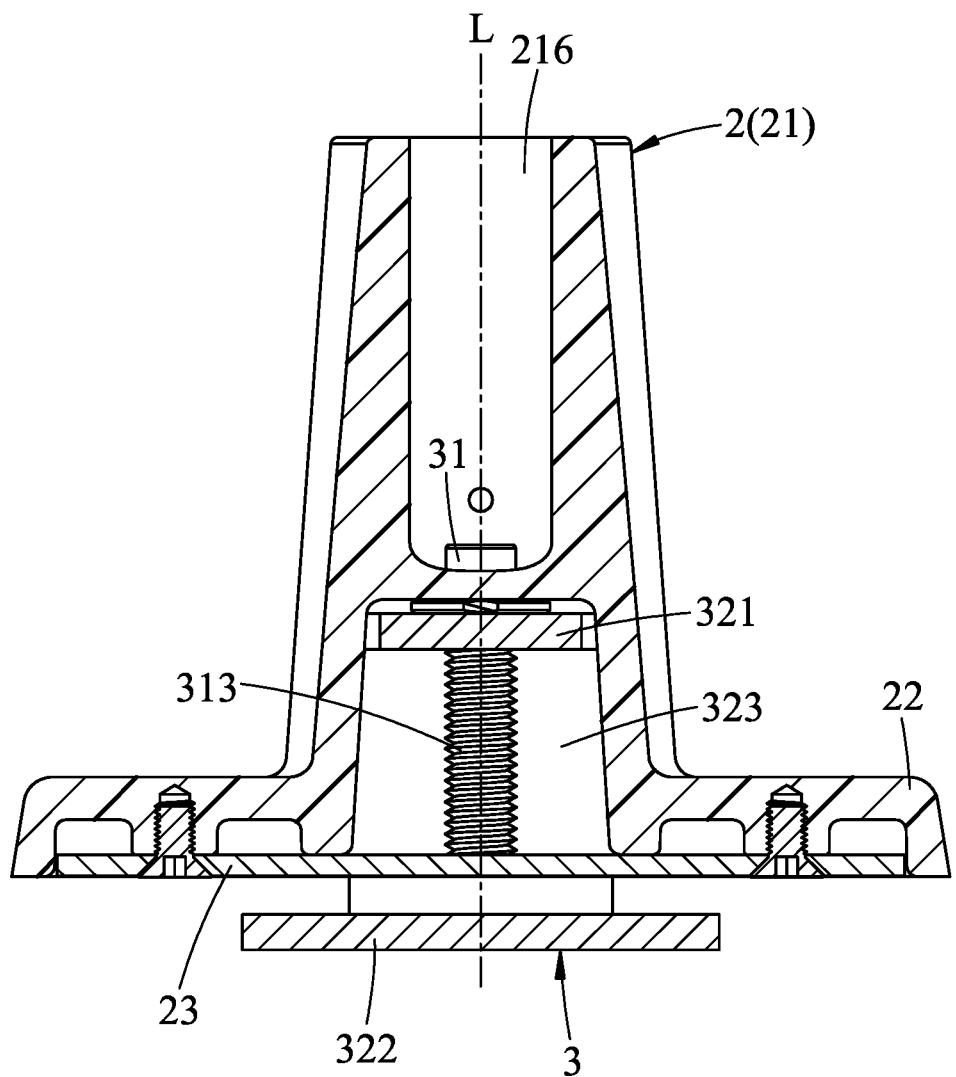
FIG. 7 is still another sectional view of the first embodiment, illustrating the clamp member at the second position.

Referring to FIGS. 5 to 7, the rotation of the bolt member 31 drives the clamp member 32 to move along the bolt member 31 between a first position and a second position. When the clamp member 32 is at the first position (shown in FIG. 5), the engaging segment 321 of the clamp member 32 abuts against the securing plate 23 of the base seat unit 2, and the clamp segment 322 of the clamp member 32 is distal from the securing plate 23. When the clamp member 32 is at the second position (shown in FIGS. 6 and 7), the engaging segment 321 of the clamp member 32 is away from the securing plate 23 of the base seat unit 2, and the clamp segment 322 of the clamp member 32 is proximate to the securing plate 23. The clamp member 32 may be easily adjusted to any position between the first position and the second position, such that a user may easily adjust a width of the clamp opening 4 by rotating the bolt member 31. It should be noted that, when the bolt member 31 is rotated to drive the clamp member 32 to move from the second position toward the first position, in a case in which the bolt member 31 is kept rotating after the clamp member 32 reaches the first position, the securing plate 23 of the base seat unit 2 prevents the clamp member 32 from falling off through the end portion 314 of the bolt member 31.

Figure 8:
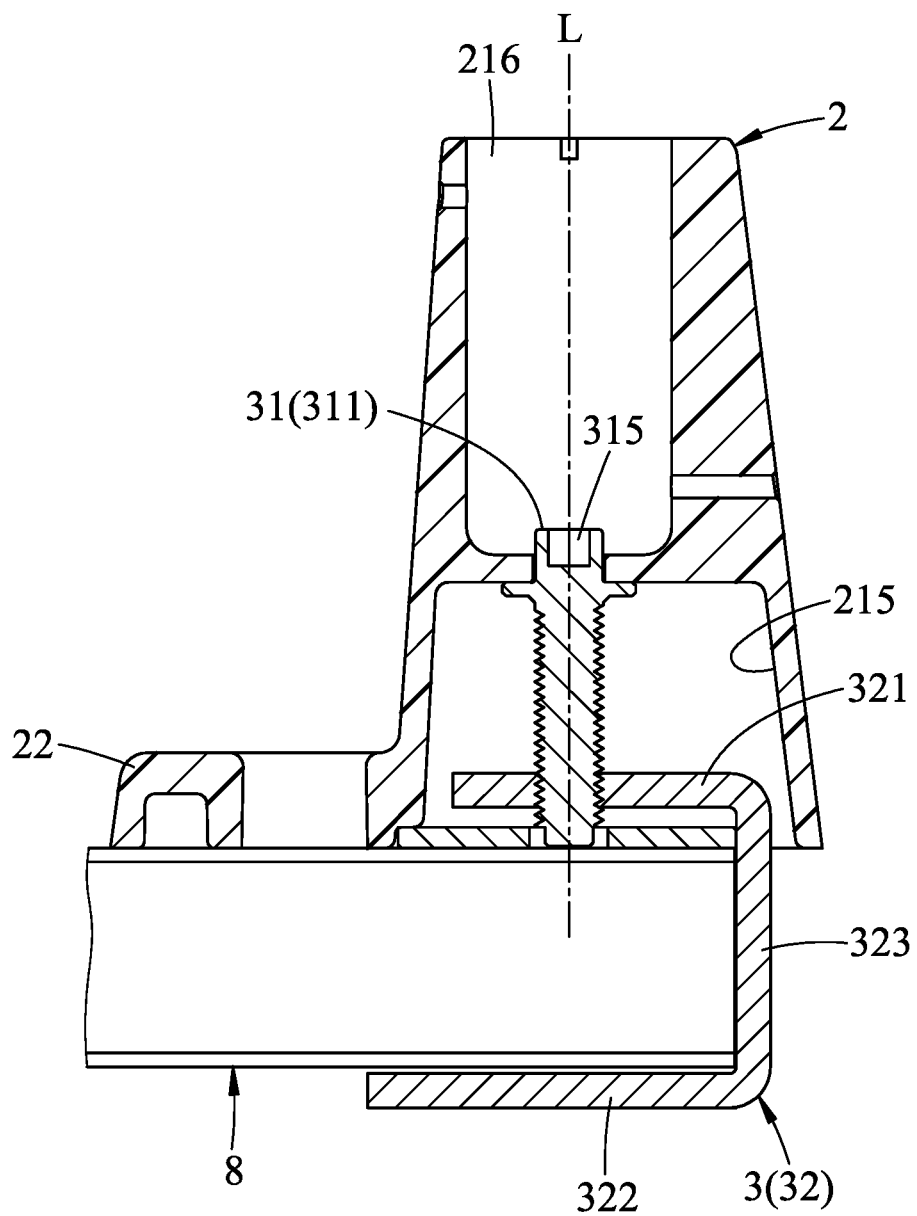
FIG. 8 is a sectional view illustrating the first embodiment clamping onto a platform.

Referring to FIGS. 3, 5 and 8, during its use, the securing base is initially secured onto a platform 8 such as a table top, followed by mounting the display suspending apparatus 9 onto the securing base. Specifically, when the user rotates the bolt member 31 to move the clamp member 32 toward the first position until the width of the clamp opening 4 is larger than the width of the platform 8, the securing base can be mounted onto the platform 8 with the clamp opening 4 being engaged to an edge of the platform 8. Afterward, the user reversely rotates the bolt member 31 and adjusts the width of the clamp opening 4 accordingly until the clamp member 32 is fittingly clamped to the platform 8.

Overall, the securing base according to the disclosure provides the following benefits:

1. The head portion 311 and the end portion 314 of the bolt member 31 are respectively and rotatably secured to the internal securing wall 219 of the base seat 21 and the insert hole 231 of the securing plate 23. The securing plate 23 prevents the clamp member 32 from falling off through the end portion 314 of the bolt member 31 when the bolt member 31 is continuously rotated.

2. The abutment seat 22 of the base seat unit 2 increases the contact surface area of the base seat unit 2 with the platform 8, therefore reinforcing the stability of the securing base when the platform 8 is fittingly clamped by the clamp member 32.

3. The protrusion of the head portion 311 of the bolt member 31 into the securing groove 216 is convenient for the user to rotate the bolt member 31 utilizing a bolt wrench for adjusting location of the clamp member 32. In addition, as the end portion 314 of the bolt member is not threaded, it can smoothly rotate in the insert hole 231.

Figure 9:
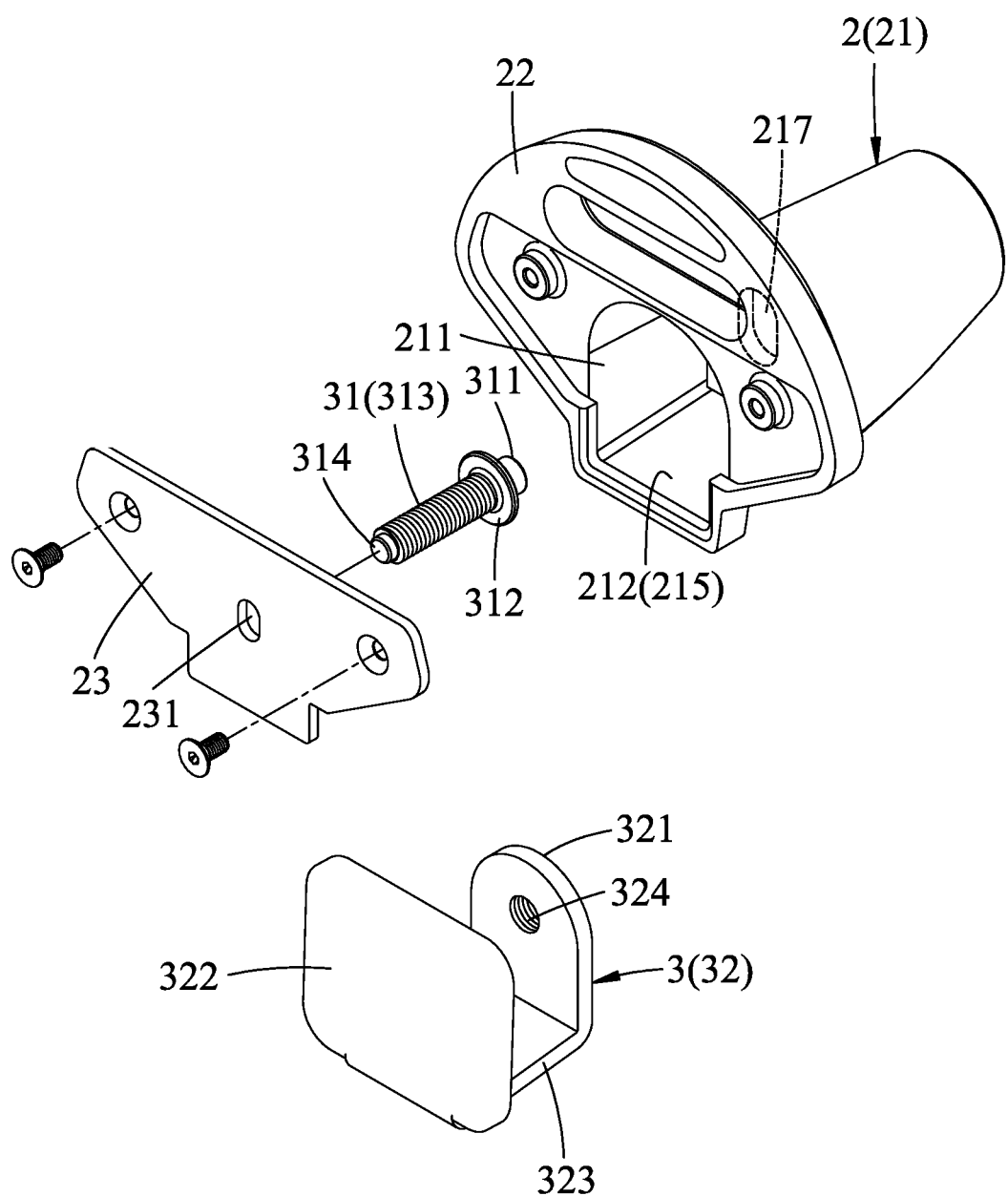
FIG. 9 is an exploded perspective view of a second embodiment of the securing base according to the disclosure.
Figure 10:
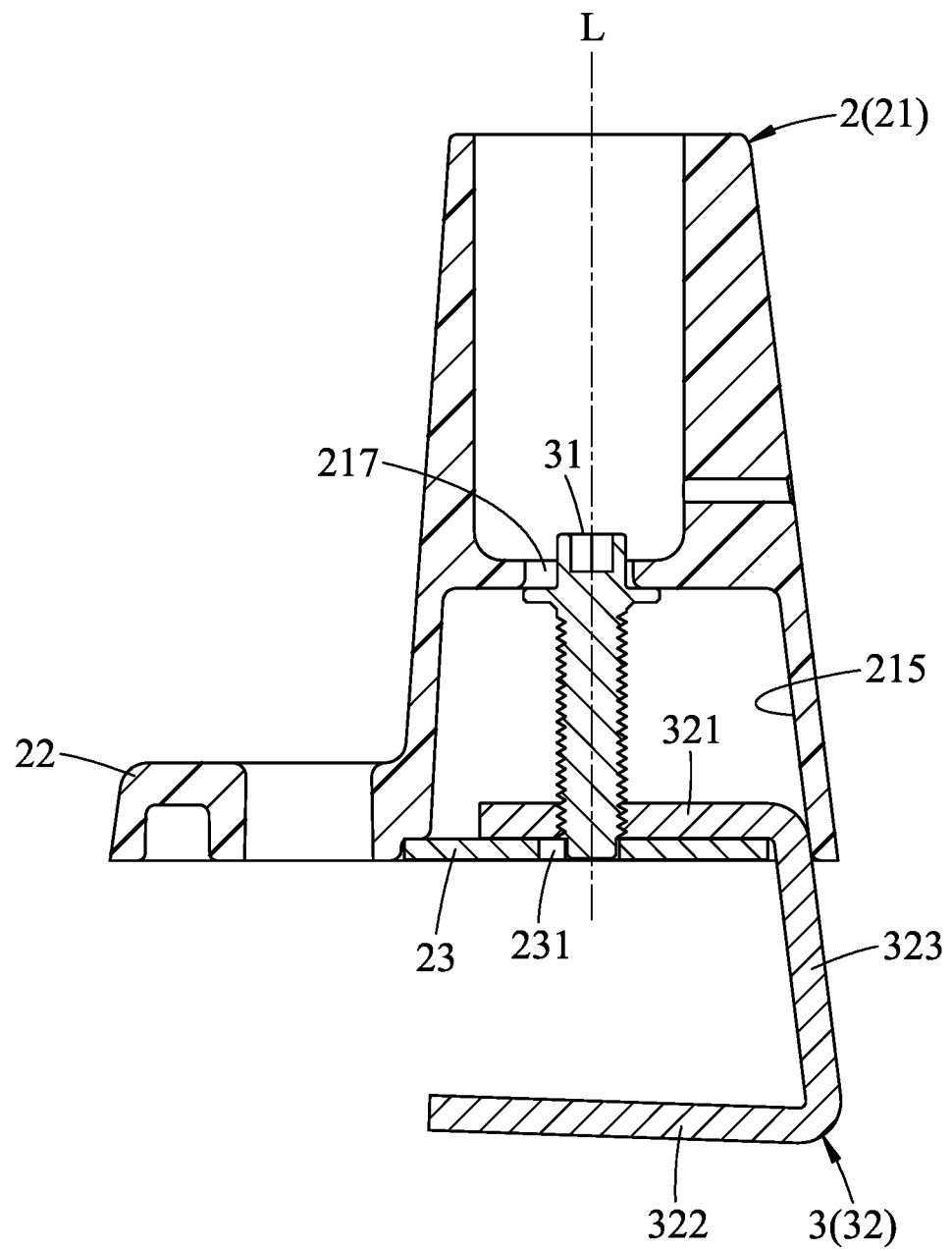
FIG. 10 is a sectional view of the second embodiment, illustrating the clamp member at the first position.
Figure 11:
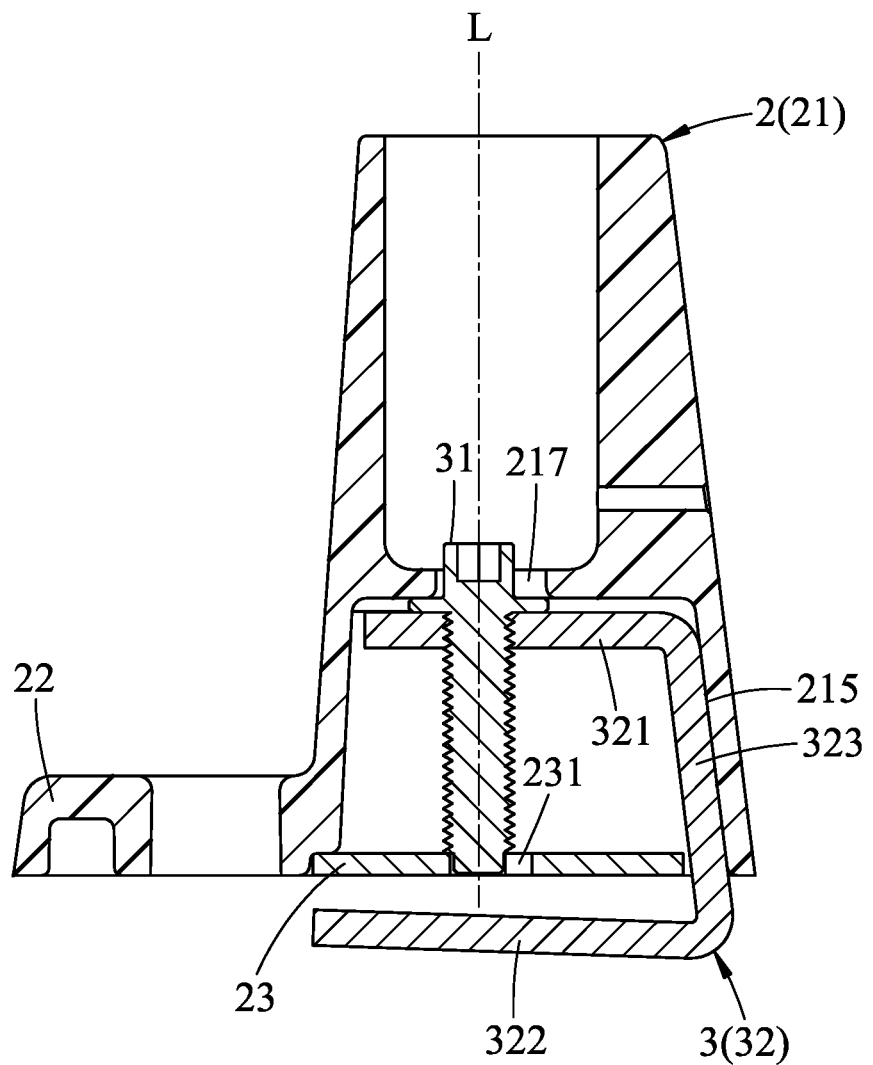
FIG. 11 is another sectional view of the second embodiment, illustrating the clamp member at the second position.

Referring to FIGS. 9 to 11, a second embodiment of the securing base is similar to the first embodiment, with some notable differences. In this embodiment, each of the retaining hole 217 of the base seat 21 and the insert hole 231 of the securing plate 23 is an elongated hole extending in a direction away from the inclined surface section 215 of the groove-defining surface 212.

In addition, the engaging segment 321 and the connecting segment 323 of the clamp member 32 cooperatively define an obtuse angle therebetween, and the clamp segment 322 and the connecting segment 323 of the clamp member 32 cooperatively define an acute angle therebetween. The obtuse angle may range from 92 degrees to 102 degrees, and the acute angle may range from 76 degrees to 86 degrees. Preferably, the obtuse angle ranges from 95 degrees to 99 degrees, and the acute angle ranges from 79 degrees to 83 degrees. In this embodiment, the obtuse angle is 97 degrees and the acute angle is 81 degrees.

Figure 12:
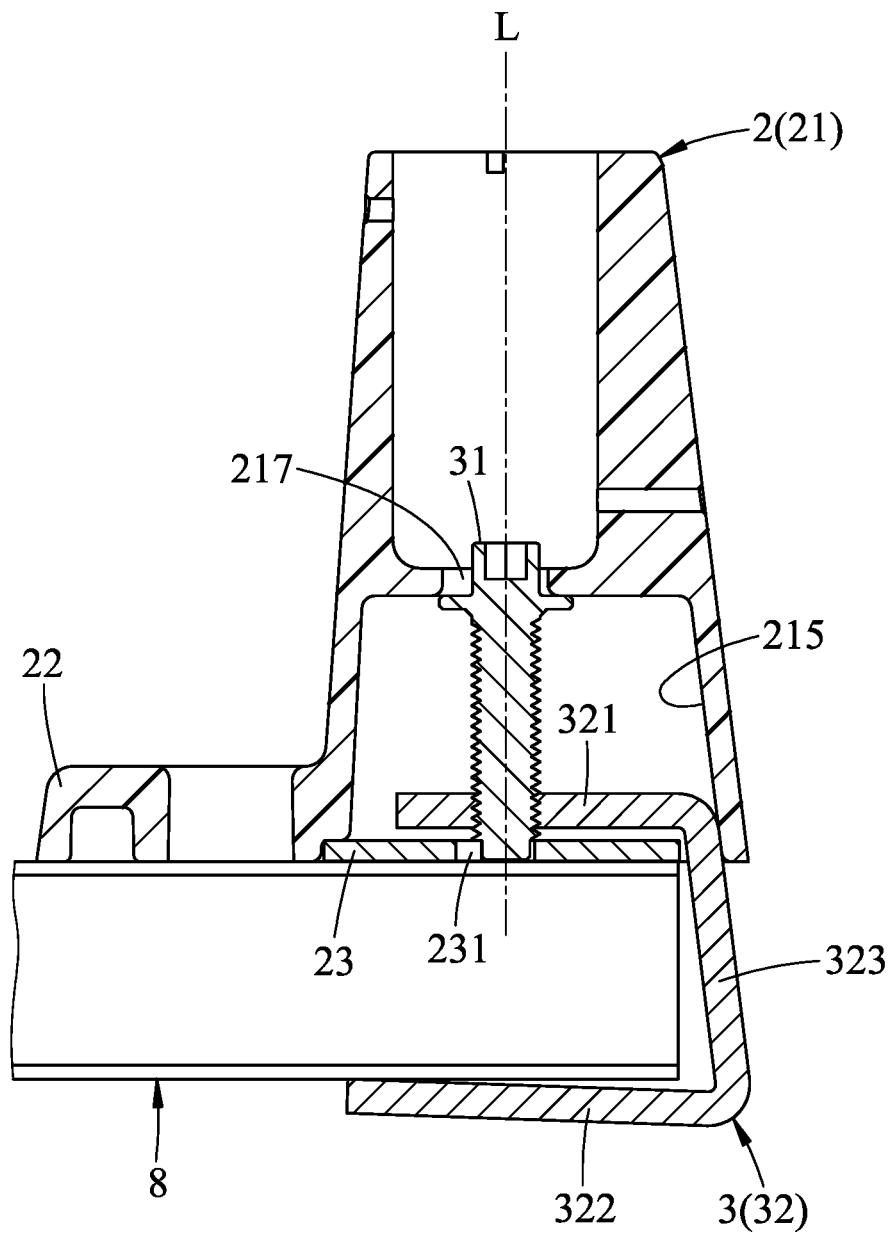
FIG. 12 is a sectional view illustrating the second embodiment clamping onto the platform.

Referring to FIGS. 10 to 12, during the movement of the clamp member 32 from the first position (shown in FIG. 10) toward the second position (shown in FIG. 11), the connecting segment 323 is guided by the inclined surface section 215 to move toward the securing plate 23 and the platform 8 when in use. When the clamp member 32 is fittingly adjusted to be clamped to the platform 8, a rear end of the clamp segment 322 that is opposite to an open end of the clamp segment 322 is brought closer to the platform 8, thereby increasing the contact surface area therebetween for reinforcing the stability of the securing base. Due to the obtuse angle between the engaging segment 321 and the connecting segment 323 of the clamp member 32, the open end of the clamp segment 322 abuts against the platform 8 initially. When the clamp member 32 moves further toward the second position, rest of the clamp segment 322 gradually abuts against the platform 8 as well, with gripping force of the open end of the clamp segment 322 being amplified to ensure that the clamp member 32 is firmly clamped to the platform 8.

As such, the second embodiment has the same benefits as those of the first embodiment. Modification to the structure of the clamp member 32 improves the gripping force of the clamp segment 322 for ensuring the stability of the securing base after installation.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A securing base comprising:
   a base seat unit including
      a base seat that is adapted for supporting a display suspending apparatus thereon, that has an internal securing wall, and that is formed with a receiving groove, said receiving groove having an opening, extending along an axis, and terminating at said internal securing wall, and
      a securing plate that is secured to said base seat and that is disposed at said opening of said receiving groove; and
   a clamp unit including
      a clamp member that has
         an engaging segment disposed within said receiving groove and formed with a threaded hole,
         a clamp segment disposed outside of said base seat unit, and
         a connecting segment interconnecting said engaging segment and said clamp segment, and
      a bolt member that extends along the axis, that engages drivingly said threaded hole of said engaging segment of said clamp member, and that has
         a head portion rotatably secured to said internal securing wall of said base seat, and
         an end portion extending rotatably into said securing plate;
   wherein rotation of said bolt member drives said clamp member to move along said bolt member between a first position, where said engaging segment of said clamp member abuts against said securing plate of said base seat unit, and where said clamp segment of said clamp member is distal from said securing plate, and a second position, where said engaging segment of said clamp member is away from said securing plate of said base seat unit, and where said clamp segment of said clamp member is proximate to said securing plate;
   wherein said base seat further has a groove-defining surface that defines said receiving groove, said internal securing wall of said base seat having an end surface that faces said securing plate, that serves as a portion of said groove-defining surface, and that is formed with a retaining hole;
   wherein said securing plate is formed with an insert hole;
   wherein said groove-defining surface of said base seat has an inclined surface section that is inclined relative to the axis;
   wherein each of said retaining hole of said base seat and said insert hole of said securing plate is an elongated hole extending in a direction away from said inclined surface section of said groove-defining surface; and
   wherein said engaging segment and said connecting segment of said clamp member cooperatively define an obtuse angle therebetween such that, during the movement of said clamp member from the first position toward the second position, said connecting segment is guided by said inclined surface section to move toward said securing plate.

2. The securing base as claimed in claim 1, wherein:

said head portion of said bolt member rotatably engages said retaining hole; and said end portion of said bolt member is rotatably retained in said insert hole.

3. The securing base as claimed in claim 2, wherein:

said base seat is further formed with a securing groove that is adapted for insertion of the display suspending apparatus, said receiving groove and said securing groove being disposed respectively at opposite sides of said internal securing wall along the axis;

said retaining hole extends through said internal securing wall and is in spatial communication with said receiving groove and said securing groove; and said head portion of said bolt member protrudes outwardly of said retaining hole.

4. The securing base as claimed in claim 2, wherein:

said bolt member further has a flange portion that is disposed in said receiving groove and that abuts against said internal securing wall of said base seat, and a threaded portion that interconnects said flange portion and said end portion;

said insert hole of said securing plate is configured in a manner that said end portion of said bolt member is loosely received in said insert hole, and that said threaded portion of said bolt member is not allowed to be inserted into said insert hole.

5. The securing base as claimed in claim 1, wherein:

said base seat unit further includes an abutment seat that is connected to said base seat and that is adjacent to said opening of said receiving groove; and said securing plate is secured to said abutment seat.

6. The securing base as claimed in claim 1, wherein the obtuse angle ranging from 92 degrees to 102 degrees.

7. The securing base as claimed in claim 6, wherein the obtuse angle ranges from 95 degrees to 99 degrees.

8. The securing base as claimed in claim 1, wherein said clamp segment and said connecting segment of said clamp member cooperatively define an acute angle therebetween, the acute angle ranging from 76 degrees to 86 degrees.

9. The securing base as claimed in claim 8, wherein the acute angle ranges from 79 degrees to 83 degrees.

* * * * *